United States Patent
Higuchi et al.

(10) Patent No.: US 7,153,224 B2
(45) Date of Patent: *Dec. 26, 2006

(54) MULTI-PIECE SOLID GOLF BALL (75) Inventors: Hiroshi Higuchi, Chichibu (JP);
Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 10/635,603

(22) Filed: Aug. 7, 2003

(65) Prior Publication Data

US 2004/0033847 A1 Feb. 19, 2004

Related U.S. Application Data

(63) Continuation-in-part of application No. 10/156,950, filed on May 30, 2002, now Pat. No. 6,634,961.

(30) Foreign Application Priority Data

May 30, 2001 (JP) ........................ 2001-163238
May 29, 2002 (GB) ............................ 0212433

(51) Int. Cl.
*A63B 37/06* (2006.01)

(52) U.S. Cl. ........................ 473/376; 524/432
(58) Field of Classification Search ........... 473/351, 473/377, 367, 368, 376
See application file for complete search history.

(56) References Cited

U.S. PATENT DOCUMENTS 5,730,664 A    3/1998 Asakura et al.
6,486,261 B1   11/2002 Wu et al.
6,596,801 B1 *  7/2003 Higuchi et al. ............. 524/432
6,602,941 B1 *  8/2003 Higuchi et al. ............. 524/432
6,634,961 B1 * 10/2003 Higuchi et al. ............. 473/357
2003/0013555 A1  1/2003 Higuchi et al.
2004/0029650 A1 * 2/2004 Higuchi et al. ............. 473/371
2004/0033847 A1 * 2/2004 Higuchi et al. ............. 473/371

FOREIGN PATENT DOCUMENTS

JP          62-089750 A     4/1987

(Continued)

*Primary Examiner*—Raeann Gorden
(74) *Attorney, Agent, or Firm*—Sughrue Mion, PLLC (57) ABSTRACT

In a multi-piece solid golf ball comprising a solid core consisting of a center core and an outer core, an inner cover layer and an outer cover layer, the solid core is molded from a rubber composition comprising a base rubber composed of (a) a polybutadiene having a high cis-1,4 content, a minimal 1,2 vinyl content and a viscosity η of up to 600 mPa·s at 25° C. as a 5 wt % toluene solution, being synthesized using a rare-earth catalyst, in combination with (b) another diene rubber, (c) an unsaturated carboxylic acid, (d) an organosulfur compound, (e) an inorganic filler, and (f) an organic peroxide; and the center core has a specific JIS-C hardness on its center and a specific JIS-C hardness on its surface and the certain difference, the outer core is harder than the surface hardness of the center core, the cross-sectional hardness of 1 mm outside from the border between the center core and the outer core is a specific range on JIS-C hardness, the surface of the outer core has a specific JIS-C hardness, the inner cover layer has a specific Shore D hardness; the outer cover layer has a specific Shore D hardness; and the outer cover layer has a lower Shore D hardness than the inner cover layer. This combination of features gives the ball a good, soft feel upon impact and an excellent spin performance that provides increased distance.

90 Claims, 1 Drawing Sheet

FOREIGN PATENT DOCUMENTS

| | | |
|---|---|---|
| JP | 63-275356 | 11/1988 |
| JP | 02-028778 | 11/1990 |
| JP | 03-151985 | 6/1991 |
| JP | 06-218078 | 8/1994 |
| JP | 06-343718 | 12/1994 |
| JP | 07-024085 | 1/1995 |
| JP | 07-268132 | 10/1995 |
| JP | 9-164224 A | 6/1997 |
| JP | 09-239068 | 9/1997 |
| JP | 10-151226 | 6/1998 |
| JP | 10-201880 | 8/1998 |
| JP | 11-035633 | 2/1999 |
| JP | 11-070187 | 3/1999 |
| JP | 11-104271 | 4/1999 |
| JP | 11-104273 | 4/1999 |
| JP | 11-164912 | 6/1999 |
| JP | 11-319148 | 11/1999 |
| JP | 2000-274807 | 9/2000 |
| JP | 2000-274843 | 9/2000 |
| JP | 2001-149502 A | 6/2001 |
| JP | 2001-149503 A | 6/2001 |
| JP | 2001 149505 A | 6/2001 |
| JP | 2001-149506 A | 6/2001 |
| JP | 2001-149507 A | 6/2001 |
| JP | 2001-149508 A | 6/2001 |
| JP | 2002-085588 A | 3/2002 |
| JP | 2002-085589 A | 3/2002 |
| JP | 2002-293996 | 10/2002 |

* cited by examiner

Figure 1

MULTI-PIECE SOLID GOLF BALL

CROSS REFERRENCE TO RELATED APPLICATION

This application is a continuation-in-part of application Ser. No. 10/156,950 filed on May 30, 2002, now U.S. Pat. No. 6,634,961, the entire contents of which are hereby incorporated by reference.

BACKGROUND OF THE INVENTION

1. Field of the Invention

The present invention relates to a multi-piece solid golf ball which has been imparted with a good, soft feel upon impact and an excellent spin performance that makes it possible to achieve an increased distance.

2. Prior Art

Various improvements are being made in formulating the polybutadiene used as the base rubber in golf balls so as to confer the balls with outstanding rebound characteristics.

For example, JP-A 62-89750 describes rubber compositions for use as the base rubber in solid golf balls, which compositions are arrived at by blending a polybutadiene having a Mooney viscosity of 70 to 100 and synthesized using a nickel or cobalt catalyst with another polybutadiene having a Mooney viscosity of 30 to 90 and synthesized using a lanthanide catalyst or polybutadiene having a Mooney viscosity of 20 to 50 and synthesized using a nickel or cobalt catalyst.

However, further improvements in the materials are required in the above art to achieve golf balls endowed with a good, soft feel upon impact and an excellent spin performance that helps increase the distance the ball travels when played.

JP-A 2-268778 describes golf balls molded using a blend composed of a polybutadiene having a Mooney viscosity of less than 50 and synthesized using a Group VIII catalyst in combination with a polybutadiene having a Mooney viscosity of less than 50 and synthesized with a lanthanide catalyst. However, golf balls with a good, soft feel upon impact and an excellent spin performance that helps increase the distance traveled by the ball cannot be obtained in this way.

The existing art also teaches multi-piece solid golf balls in which an intermediate layer is molded of a low-Mooney viscosity polybutadiene (JP-A 11-70187), solid golf balls molded from rubber compositions comprising a polybutadiene having a Mooney viscosity of 50 to 69 and synthesized using a nickel or cobalt catalyst in combination with a polybutadiene having a Mooney viscosity of 20 to 90 and synthesized using a lanthanide catalyst (JP-A 11-319148), solid golf balls molded from compositions based on a rubber having a 1,2 vinyl content of at most 2.0% and a weight-average molecular weight to number-average molecular weight ratio Mw/Mn of not more than 3.5 (JP-A 11-164912), golf balls molded from rubber compositions containing a high Mooney viscosity polybutadiene (JP-A 63-275356), and golf balls molded from rubber compositions comprising polybutadiene having a high number-average molecular weight in admixture with polybutadiene having a low number-average molecular weight (JP-A 3-151985). However, none of these prior-art golf balls truly have a good, soft feel upon impact and an excellent spin performance that helps increase the distance traveled by the ball.

Golf balls having a cover composed of a relatively hard inner layer and a relatively soft outer layer have already been disclosed in JP-A 6-218078, JP-A 6-343718, JP-A 7-24085, JP-A 9-239068, JP-A 10-151226, JP-A 10-201880, JP-A 11-104273, JP-A 11-104271, and Japanese Patent Applications No. 2000-274807 and 2000-274843. However, further improvements in distance are desired for the golf balls described in all of these specifications.

SUMMARY OF THE INVENTION

It is therefore an object of the present invention to provide multi-piece solid golf balls which are endowed with a good, soft feel when hit with a golf club and an excellent spin performance that helps increase the distance traveled by the ball when played.

The inventor has discovered that golf balls having a solid core consisting of a center core and an outer core, an inner cover layer and an outer cover layer, wherein the solid core is made of a rubber composition formulated from a particular type of base rubber combined in specific proportions with certain other materials, and the center core and the outer core and relationship therebetween are specified to the specific hardness and the inner cover layer the outer cover layer and the relationships therebetween are specified to the specific, exhibit a good synergy from optimization of the solid core materials and an appropriate distribution of hardness between the inner and outer cover layers. Multi-piece solid golf balls thus constituted have a good, soft feel when hit with a golf club and an excellent spin performance that enables the ball to travel further when played.

Accordingly, the invention provides a multi-piece solid golf ball comprising a solid core consisting of a center core and an outer core, an inner cover layer and an outer cover layer. The solid core is molded from a rubber composition comprising 100 parts by weight of a base rubber composed of (a) 20 to 100 wt % of a polybutadiene having a cis-1,4 content of at least 60% and a 1,2 vinyl content of at most 2%, having a viscosity $\eta$ at 25° C. as a 5 wt % solution in toluene of up to 600 mPa·s, being synthesized using a rare-earth catalyst, in combination with (b) 0 to 80 wt % of a diene rubber other than component (a). The rubber composition includes also (c) 10 to 60 parts by weight of an unsaturated carboxylic acid or a metal salt thereof or both, (d) 0.1 to 5 parts by weight of an organosulfur compound, (e) 5 to 80 parts by weight of an inorganic filler, and (f) 0.1 to 5 parts by weight of an organic peroxide. The center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, the surface of the outer core has a JIS-C hardness of 75 to 95.

In the multi-piece solid golf ball of the invention, it is generally advantageous for the inner cover layer to have a Shore D hardness of 50 to 80 and the outer cover layer to have a Shore D hardness of 35 to 60, and the outer cover layer has a lower Shore D hardness than the inner cover layer.

BRIEF DESCRIPTION OF THE FIGURE

The advantages, nature and various additional features of the invention will appear more fully upon consideration of the illustrative embodiment of the invention which is schematically set forth in the figures, in which.

DETAILED DESCRIPTION OF THE INVENTION

The golf ball of the invention includes a solid core made of a rubber composition in which the base rubber is at least partly polybutadiene. It is critical that the base rubber contain as component (a) a specific amount of a polybutadiene in which the cis-1,4 and 1,2 vinyl contents, the viscosity η at 25° C. as a 5 wt % solution in toluene, and the relationship between the Mooney viscosity and the polydispersity index Mw/Mn have each been optimized.

That is, the polybutadiene (a) has a cis-1,4 content of at least 60%, preferably at least 80%, more preferably at least 90%, and most preferably at least 95%; and has a 1,2 vinyl content of at most 2%, preferably at most 1.7%, more preferably at most 1.5%, and most preferably at most 1.3%. Outside of the above ranges, the resilience declines.

The polybutadiene (a) must also have a viscosity η at 25° C. as a 5 wt % solution in toluene of not more than 600 mPa·s. "Viscosity η at 25° C. as a 5 wt % solution in toluene" refers herein to the value in mPa·s units obtained by dissolving 2.28 g of the polybutadiene to be measured in 50 ml of toluene and carrying out measurement with a specified viscometer at 25° C. using a standard solution for the viscometer (JIS Z8809).

The polybutadiene (a) has a viscosity η at 25° C. as a 5 wt % solution in toluene of not more than 600 mPa·s, preferably not more than 550 mPa·s, more preferably not more than 500 mPa·s, even more preferably not more than 450 mPa·s, and most preferably not more than 400 mPa·s. Too high a viscosity η lowers the workability of the rubber composition. It is recommended that the viscosity η be at least 50 mPa·s, preferably at least 100 mPa·s, more preferably at least 150 mPa·s, and most preferably at least 200 mPa·s. Too low a viscosity η may lower the resilience.

In addition, it is recommended that the polybutadiene (a) satisfies the relationship:

$$10B+5 \leq A \leq 10B+60,$$

wherein A is the Mooney viscosity ($ML_{1+4}$ (100° C.)) of the polybutadiene and B is the ratio Mw/Mn between the weight-average molecular weight Mw and the number-average molecular weight Mn of the polybutadiene. A is preferably at least 10B+7, more preferably at least 10B+8 and most preferably at least 10B+9, but preferably not more than 10B+55, more preferably not more than 10B+50, and most preferably not more than 10B+45. If A is too low, the resilience declines. On the other hand, if A is too high, the workability of the rubber composition worsens.

It is recommended that the polybutadiene (a) have a Mooney viscosity ($ML_{1+4}$ (100° C.)) of at least 20, preferably at least 30, more preferably at least 40, and most preferably at least 50, but not more than 80, preferably not more than 70, more preferably not more than 65, and most preferably not more than 60.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

The polybutadiene (a) must be synthesized using a rare-earth catalyst. A known rare-earth catalyst may be used for this purpose.

Examples of suitable catalysts include lanthanide series rare-earth compounds, organoaluminum compounds, alumoxane, halogen-bearing compounds, optionally in combination with Lewis bases.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon residue of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon residue of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$ (wherein "Me" stands for methyl); and other metal halides such as silicon tetrachloride, tin tetrachloride and titanium tetrachloride.

The Lewis base may be used to form a complex with the lanthanide series rare-earth compound. Illustrative examples include acetylacetone and ketone alcohols.

In the practice of the invention, the use of a neodymium catalyst composed in part of a neodymium compound as the lanthanide series rare-earth compound is advantageous because it enables a polybutadiene rubber having a high cis-1,4 content and a low 1,2 vinyl content to be obtained at an excellent polymerization activity. Preferred examples of such rare-earth catalysts include those mentioned in JP-A 11-35633.

For polymerization of butadiene in the presence of a rare-earth catalyst in the form of a lanthanoid series rare-earth compound, in order that the cis content and the Mw/Mn fall in the above-mentioned ranges, the molar ratio of butadiene to lanthanoid series rare-earth compound is preferably from 1,000/1 to 2,000,000/1, especially from 5,000/1 to 1,000,000/1, and the molar ratio of $AlR^1R^2R^3$ to lanthanoid series rare-earth compound is preferably from 1/1 to 1,000/1, especially from 3/1 to 500/1. Further, the molar ratio of halogen compound to lanthanoid series rare-earth compound is preferably from 0.1/1 to 30/1, especially from 0.2/1 to 15/1. The molar ratio of Lewis base to lanthanoid series rare-earth compound is preferably from 0 to 30/1, especially from 1/1 to 10/1. The polymerization of butadiene in the presence of a rare-earth catalyst may be carried out either with or without the use of solvent, as by bulk polymerization or vapor phase polymerization. The polymerization temperature is generally in a range of −30° C. to 150° C., and preferably 10° C. to 100° C.

It is also possible for the polybutadiene (a) to be obtained by polymerization using the above-described rare-earth catalyst, followed by the reaction of an end group modifier with active end groups on the polymer.

Modified polybutadiene rubbers can be prepared by using end group modifiers (1) to (7) listed below, following the above polymerization.

(1) Compounds having an alkoxysilyl group to be reacted with the polymer at active ends thereof. Suitable compounds having an alkoxysilyl group are alkoxysilane compounds having at least one epoxy or isocyanate group in a molecule, for example, epoxy group-containing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensates of 3-glycidyloxypropyltrimethoxysilane, and condensates of (3-glycidyloxypropyl)methyldimethoxysilane; and isocyanato group-containing alkoxysilanes such as 3-isocyanatopropyltrimethoxysilane, 3-isocyanatopropyltriethoxysilane, (3-isocyanatopropyl)methyldimethoxysilane, (3-isocyanatopropyl)methyldiethoxysilane, condensates of 3-isocyanatopropyltrimethoxysilane, and condensates of (3-isocyanatopropyl)methyldimethoxysilane.

When a compound having an alkoxysilyl group is reacted to active ends of the polymer, a Lewis acid may be added for promoting the reaction. The Lewis acid added serves as a catalyst to promote coupling reaction for improving the cold flow and storage stability of the modified polymer. Examples of the Lewis acid include dialkyltin dialkylmaleates, dialkyltin dicarboxylates, and aluminum trialkoxides.

(2) Halogenated organometallic compounds, halogenated metallic compounds and organometallic compounds of the general formulas: $R^5_nM'X_{4-n}$, $M'X_4$, $M'X_3$, $R^5_nM'$ $(-R^6-COOR^7)_{4-n}$ or $R^5_nM'$ $(-R^6-COR^7)_{4-n}$ (wherein $R^5$ and $R^6$ are each independently a hydrocarbon group of 1 to 20 carbon atoms; $R^7$ is a hydrocarbon group of 1 to 20 carbon atoms which may contain a carbonyl or ester moiety on a side chain; M' is a tin atom, silicon atom, germanium atom or phosphorus atom; X is a halogen atom; and n is an integer from 0 to 3).

(3) Heterocumulene compounds containing on the molecule a Y=C=Z linkage (wherein Y is a carbon atom, oxygen atom, nitrogen atom or sulfur atom; and Z is an oxygen atom, nitrogen atom or sulfur atom).

(4) Three-membered heterocyclic compounds containing on the molecule the following linkage:

(wherein Y is an oxygen atom, nitrogen atom or sulfur atom).

(5) Halogenated isocyano compounds.

(6) Carboxylic acids, acid halides, ester compounds, carbonate compounds or acid anhydrides of the formulas: $R^8-(COOH)_m$, $R^9(COX)_m$, $R^{10}-(COO-R^{11})_m$, $R^{12}-OCOO-R^{13}$, $R^{14}-(COOCO-R^{15})_m$ or the following formula:

(wherein $R^8$ to $R^{16}$ are each independently a hydrocarbon group of 1 to 50 carbon atoms; X is a halogen atom; and m is an integer from 1 to 5); and (7) Carboxylic acid metal salts of the formula: $R^{17}_lM''$ $(OCOR^{18})_{4-l}$, $R^{19}_lM''$ $(OCO-R^{20}-COOR^{21})_{4-l}$ or the following formula:

(wherein $R^{17}$ to $R^{23}$ are each independently a hydrocarbon group of 1 to 20 carbon atoms, M'' is a tin atom, silicon atom or germanium atom; and l is an integer from 0 to 3).

Illustrative examples of the end group modifiers of types (1) to (7) above and methods for their reaction are described in, for instance, JP-A 11-35633, JP-A 7-268132 and JP-A 2002-293996.

In the practice of the invention, component (a) is included in the base rubber in an amount of at least 20 wt %, preferably at least 25 wt %, more preferably at least 30 wt %, and most preferably at least 35 wt %. The upper limit is 100 wt %, preferably not more than 90 wt %, more preferably not more than 80 wt %, and most preferably not more than 70 wt %.

In addition to component (a), the base rubber may include also a diene rubber (b) insofar as the objects of the invention are attainable. Specific examples of the diene rubbers (b) include polybutadiene rubber, styrene-butadiene rubber (SBR), natural rubber, polyisoprene rubber, and ethylene-propylene-diene rubber (EPDM). Any one or combination of two or more thereof may be used.

The diene rubber (b) is included together with component (a) in the base rubber in an amount of at least 0 wt %, preferably at least 10 wt %, more preferably at least 20 wt %, and most preferably at least 30 wt %, but not more than 80 wt %, preferably not more than 75 wt %, more preferably not more than 70 wt %, and most preferably not more than 65 wt %.

In the practice of the invention, it is preferable for component (b) to include a polybutadiene rubber, and especially one for which the cis-1,4 and 1,2 vinyl contents, the Mooney viscosity, and the relationship between the Mooney viscosity and η have each been optimized. The polybutadiene serving as component (b) is referred to as "second polybutadiene" in order to distinguish it from the polybutadiene serving as component (a).

It is recommended that the second polybutadiene in component (b) have a cis-1,4 content of at least 60%, preferably at least 80%, more preferably at least 90%, and most preferably at least 95%, and that it have a 1,2 vinyl content of at most 5%, preferably at most 4.5%, more preferably at most 4.0%, and most preferably at most 3.5%.

It is recommended that the second polybutadiene have a Mooney viscosity of at least 10, preferably at least 20, more preferably at least 25, and most preferably at least 30, but not more than 55, preferably not more than 50, and most preferably not more than 45.

In the practice of the invention, it is recommended that the second polybutadiene be one that has been synthesized using a Group VIII catalyst. Exemplary Group VIII catalysts include nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complexes. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include the following composed of cobalt or cobalt compounds: Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use the above in combination with a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkyl aluminum sesquichloride such as ethylaluminum sesquichloride; or aluminum chloride.

Polymerization using the Group VIII catalysts described above, and especially a nickel or cobalt catalyst, can generally be carried out by a process in which the catalyst is continuously charged into the reactor together with the solvent and butadiene monomer, and the reaction conditions are suitably selected from a temperature range of 5 to 60° C. and a pressure range of atmospheric pressure to 70 plus atmospheres, so as to yield a product having the above-indicated Mooney viscosity.

It is also desirable for the second polybutadiene in component (b) to satisfy the relationship:

$$20A-750 \leq \eta \leq 20A-550,$$

wherein η is the viscosity of the second polybutadiene at 25° C. as a 5 wt % solution in toluene and A is the Mooney viscosity ($ML_{1+4}$ (100° C.)) of the second polybutadiene. The viscosity η is preferably at least 20A-700, more preferably at least 20A-680, and most preferably at least 20A-650, but preferably not more than 20A-560, more preferably not more than 20A-580, and most preferably not more than 20A-590. The use of a polybutadiene having such an optimized relationship of η and A, that suggests the high linearity of polybutadiene molecules, is effective for conferring better resilience and workability.

The second polybutadiene generally accounts for at least 30 wt %, preferably at least 50 wt %, and most preferably at least 70 wt %, and up to 100 wt %, preferably up to 90 wt %, and most preferably up to 80 wt %, of the diene rubber (b). By including the second polybutadiene within component (b) in the foregoing range, even better extrudability and hence, workability during manufacture can be conferred.

The solid core in the golf balls of the invention is molded from a rubber composition containing as essential components specific amounts of (c) an unsaturated carboxylic acid and/or metal salt thereof, (d) an organosulfur compound, (e) an inorganic filler and (f) an organic peroxide per 100 parts by weight of the base rubber.

Specific examples of unsaturated carboxylic acids that may be used as component (c) include acrylic acid, methacrylic acid, maleic acid and fumaric acid. Acrylic acid and methacrylic acid are especially preferred.

Specific examples of unsaturated carboxylic acid metal salts that may be used as component (c) include the zinc and magnesium salts of unsaturated fatty acids such as zinc methacrylate and zinc acrylate. Zinc acrylate is especially preferred.

The unsaturated carboxylic acid and/or metal salt thereof used as component (c) is included in an amount, per 100 parts by weight of the base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much component (c) results in excessive hardness, giving the golf ball a feel upon impact that is difficult for the player to endure. On the other hand, too little component (c) undesirably lowers the resilience.

The organosulfur compound (d) of the rubber composition is essential for imparting good resilience. Exemplary organosulfur compounds include thiophenol, thionaphthol, halogenated thiophenols, and metal salts thereof. Specific examples include pentachlorothiophenol, pentafluorothiophenol, pentabromothiophenol, p-chlorothiophenol, and zinc salts thereof, such as the zinc salt of pentachlorothiophenol; and organosulfur compounds having 2 to 4 sulfurs, such as diphenylpolysulfides, dibenzylpolysulfides, dibenzoylpolysulfides, dibenzothiazoylpolysulfides and dithiobenzoylpolysulfides. Diphenyldisulfide and the zinc salt of pentachlorothiophenol are especially preferred.

The organosulfur compound (d) is included in an amount, per 100 parts by weight of the base rubber, of at least 0.1 part by weight, preferably at least 0.2 part by weight, and most preferably at least 0.5 part by weight, but not more than 5 parts by weight, preferably not more than 4 parts by weight, more preferably not more than 3 parts by weight, and most preferably not more than 2 parts by weight. Too much organosulfur compound results in an excessively low hardness, whereas too little makes it impossible to enhance the resilience.

Examples of inorganic fillers that may be used as component (e) include zinc oxide, barium sulfate and calcium carbonate. The inorganic filler (e) is included in an amount, per 100 parts by weight of the base rubber, of at least 5 parts by weight, preferably at least 7 parts by weight, more preferably at least 10 parts by weight, and most preferably at least 13 parts by weight, but not more than 80 parts by weight, preferably not more than 50 parts by weight, more preferably not more than 45 parts by weight, and most preferably not more than 40 parts by weight. Too much or too little inorganic filler makes it impossible to achieve a golf ball core having an appropriate weight and good rebound characteristics.

The organic peroxide (f) may be a commercial product, suitable examples of which include Percumil D (manufactured by NOF Corporation), Perhexa 3M (manufactured by NOF Corporation) and Luperco 231XL (manufactured by Atochem Co.). If necessary, two or more different organic peroxides may be mixed and used together.

The organic peroxide (f) is included in an amount, per 100 parts by weight of the base rubber, of at least 0.1 part by weight, preferably at least 0.3 part by weight, more preferably at least 0.5 part by weight, and most preferably at least 0.7 part by weight, but not more than 5 parts by weight, preferably not more than 4 parts by weight, more preferably not more than 3 parts by weight, and most preferably not more than 2 parts by weight. Too much or too little organic peroxide makes it impossible to achieve a ball having a good feel upon impact and good durability and rebound characteristics.

If necessary, the rubber composition may also include an antioxidant, suitable examples of which include such commercial products as Nocrac NS-6, Nocrac NS-30 (both made by Ouchi Shinko Chemical Industry Co., Ltd.), and Yoshinox 425 (made by Yoshitomi Pharmaceutical Industries, Ltd.). The use of such an antioxidant in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight, is desirable for achieving good rebound characteristics and durability.

Figure 1:
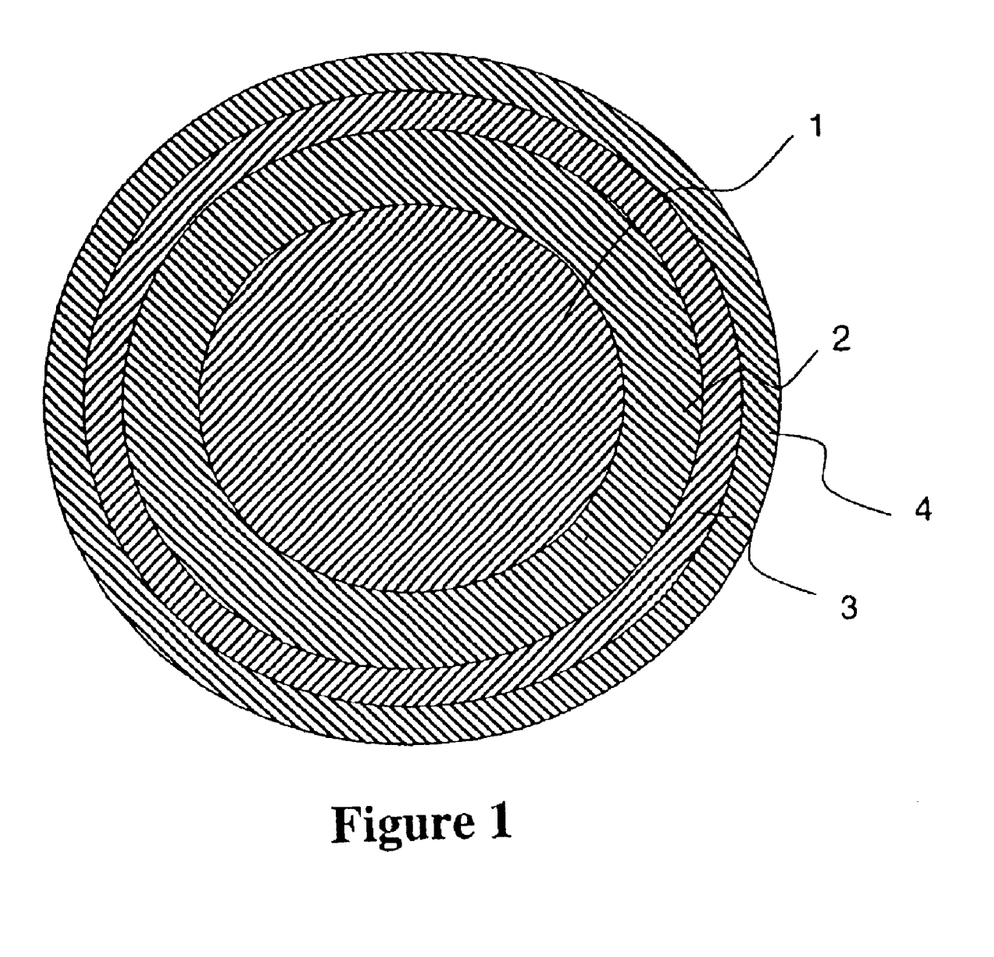
FIG. 1 is a diagrammatical representation of a golf ball according to the present invention.

As shown in FIG. 1, the solid core consists of a center core 1 and an outer core 2 around the center core 1. That construction of the solid core realize the reduction of the spin rate when hitting, thereby to increase the flight distance of the golf balls substantially.

It is recommended that the center core is formed to a diameter of at least 15 mm, preferably at least 20 mm, more preferably at least 22 mm, most preferably at least 24, but not more than 36 mm, preferably not more than 33 mm, more preferably not more than 30 mm, most preferably not more than 28 mm.

It is also recommended that the center hardness of the center core on a JIS-C scale is at least 40, preferably at least 42, more preferably at least 44, most preferably at least 46, but not more than 60, preferably not more than 58, more preferably not more than 56, most preferably not more than 54. It is further recommended that the surface hardness of the center core on a JIS-C scale is at least 55, preferably at least 57, more preferably at least 59, most preferably at least 61, but not more than 75, preferably not more than 73, more preferably not more than 71, most preferably not more than 69.

In the center core, the difference between the center hardness and the surface on a JIS-C scale is at least 10. It is recommended that the difference of the hardness on a JIS-C scale therebetween is at least 12, preferably at least 13, more preferably at least 15, but not more than 25, preferably not more than 23, more preferably not more than 20.

It is recommended that the outer core has a thickness of at least 1.5 mm, preferably at least 2 mm, more preferably at least 2.5 mm, most preferably 3 mm, but not more than 10 mm, preferably not more than 9 mm, more preferably not more than 8 mm, most preferably not more than 7 mm.

The outer core is harder than the surface hardness of the center core. In particular, it is recommended that the difference between the hardness of the outer core and the surface hardness of the center core is at least 2, preferably at least 3, more preferably at least 4, but not more than 30, preferably not more than 20, more preferably not more than 15. It is recommended that a surface hardness of the outer core on a JIS-C scale is at least 75, preferably at least 77, more preferably at least 79, most preferably at least 81, but not more than 95, preferably not more than 93, more preferably not more than 91, most preferably not more than 89.

The cross-sectional hardness of 1 mm outside from the border between the center core and the outer core on a JIS-C scale is at least 65, preferably at least 68, more preferably at least 71, most preferably at least 74, but not more than 85, preferably not more than 83, more preferably not more than 80, most preferably not more than 77.

In the present invention, the center core and the outer core are formed by an injection molding process and a compression molding process, respectively. It is preferred that the non-vulcanized rubber composition for an outer core is filled into the cavity of the mold used for a preparation of hemispherical cups and is subjected to semi-vulcanization at 100 to 160° C. for 1 to 10 minutes to form a pair of hemispherical cups in the state of semi-vulcanization. Then the pair of cups are fitted each other and the pair of cups cover the center core to prepare a solid core consisting of the center core and the outer core by a press molding process into a cavity of the mold at 100 to 200° C. for 5 to 20 minutes.

The golf ball of the invention is a multi-piece solid golf ball having a cover composed of at least two layers which are referred to herein as the "inner cover layer" 3 and the "outer cover layer" 4. Such cover layers can be produced from known cover stock. The cover stocks used to make both cover layers in the inventive golf ball may be composed primarily of a thermoplastic or thermoset polyurethane elastomer, polyester elastomer, ionomer resin, ionomer resin having a relatively high degree of neutralization, polyolefin elastomer or mixture thereof. Any one or mixture of two or more thereof may be used, although the use of a thermoplastic polyurethane elastomer, ionomer resin or ionomer resin having a relatively high degree of neutralization is especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8290, Pandex T8295 and Pandex T1188 (all manufactured by DIC Bayer Polymer, Ltd.). Illustrative examples of suitable commercial ionomer resins include Surlyn 6320, Surlyn 8945, Surlyn 9945 and Surlyn 8120 (both products of E.I. du Pont de Nemours and Co., Inc.), and Himilan 1706, Himilan 1605, Himilan 1855, Himilan 1557, Himilan 1601 and Himilan AM7316 (all products of DuPont-Mitsui Polychemicals Co., Ltd.).

Together with the primary material described above, the cover stock may include also, as an optional material, polymers (e.g., thermoplastic elastomers) other than the foregoing. Specific examples of polymers that may be included as optional constituents include polyamide elastomers, styrene block elastomers, hydrogenated polybutadienes and ethylene-vinyl acetate (EVA) copolymers.

The multi-piece solid golf ball of the invention can be manufactured by any suitable known method without particular limitation. In one preferred method, the solid core is placed within a given injection mold, following which a predetermined method is used to successively inject over the core the above-described inner and outer cover layer materials. In another preferred method, each of the cover stocks is formed into a pair of half cups, and the resulting pairs are successively placed over the solid core and compression molded.

In the golf balls of the invention, it is critical that the inner cover layer has a Shore D hardness of 50 to 80 and the outer cover layer has a Shore D hardness of 35 to 60, and the outer cover layer has a lower Shore D hardness than the inner cover layer.

It is recommended that the inner cover layer have a Shore D hardness of at least 51, preferably at least 52, and most preferably at least 53, but not more than 75, preferably not more than 70, and most preferably not more than 65.

It is recommended that the outer cover layer have a Shore D hardness of at least 40, preferably at least 45, and most preferably at least 48, but not more than 58, preferably not more than 56, and most preferably not more than 54.

As noted above, in the practice of the invention the outer cover layer must have a lower Shore D hardness than the inner cover layer. It is advantageous for the inner and outer cover layers to have a difference in Shore D hardness of at least 2, preferably at least 5, more preferably at least 7, and most preferably at least 9 Shore D hardness units, but not more than 30, preferably not more than 25, and most preferably not more than 20 Shore D hardness units.

It is recommended that the inner and outer cover layers have a respective thickness of at least 0.2 mm, preferably at least 0.5 mm, more preferably at least 0.8 mm, most preferably at least 1.0 mm. It is recommended that the inner cover layer has a thickness of not more than 3.0 mm, preferably not more than 2.5 mm, more preferably not more than 2.0 mm, most preferably not more than 1.5 mm. It is also recommended that the outer cover layer has a thickness of not more than 2.0 mm, preferably not more than 1.8 mm, more preferably not more than 1.5 mm, most preferably not more than 1.2 mm.

The multi-piece solid golf ball of the invention can be manufactured for competitive use by imparting the ball with a diameter and weight which conform with the Rules of Golf; that is, a diameter of at least 42.67 mm and a weight of not more than 45.93 g. It is recommended that the diameter be no more than 44.0 mm, preferably no more than 43.5 mm, and most preferably no more than 43.0 mm; and that the weight be at least 44.5 g, preferably at least 45.0 g, more preferably at least 45.1 g, and most preferably at least 45.2 g.

Multi-piece solid golf balls according to the present invention have a good, soft feel upon impact and an excellent spin performance that enable the ball to travel a greater distance when played.

EXAMPLES

The following examples and comparative examples are provided to illustrate the invention, and are not intended to limit the scope thereof.

Examples 1–4 & Comparative Examples 1–6

The center core materials and the outer core materials shown in Table 2 were formulated in the indicated amounts per 100 parts by weight of polybutadiene material composed of polybutadiene types (1) to (5) below in the proportions shown in Table 1. The resulting center core formulations were blended in a kneader or on a roll mill and then were compression molded at 160° C. for 15 minutes to form the center core. The resulting outer core formulations were blended and then were compression molded at 130° C. for 3 minutes to form the outer core in form of the pair of cups. The resulting pairs are successively placed over the center core and compression molded one again at 170° C. for 10 minutes to obtain the solid core having two layers consisting of the center core and the outer core.

Types of Polybutadiene:
(1) BR01, made by JSR Corporation
(2) BR11, made by JSR Corporation
(3) HCBN-4, an experimental grade of polybutadiene made by JSR Corporation
(4) Experimental grade #9100081 made by Firestone
(5) BR 730, made by JSR Corporation

TABLE 1

| | Type | Catalyst | cis-1,4 content, % | 1,2 vinyl content, % | Mooney viscosity (A) | Mw/Mn (B) | η | 10B + 5 | 10B + 60 | 20A − 550 |
|---|---|---|---|---|---|---|---|---|---|---|
| Polybutadiene | (1) | Ni | 96 | 2.5 | 44 | 4.2 | 150 | 47 | 102 | 330 |
| | (2) | Ni | 96 | 2 | 44 | 4.4 | 270 | 49 | 104 | 330 |
| | (3) | Nd | 96 | 1.1 | 44 | 3.5 | 390 | 40 | 95 | 330 |
| | (4) | Nd | 95 | 1.5 | 56 | 2.6 | 370 | 31 | 86 | 570 |
| | (5) | Nd | 96 | 1.2 | 55 | 3 | 400 | 35 | 90 | 550 |

TABLE 2

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Center Core | | | | | | | | | | | |
| Center Core formulation (pbw) | Polybutadiene (1) | | | | | 100 | | | | | |
| | Polybutadiene (2) | | 30 | | | | | | | | |
| | Polybutadiene (3) | | | 100 | | | | | 100 | 100 | 100 |
| | Polybutadiene (4) | | 70 | | | | | | | | |
| | Poybutadiene (5) | 100 | | | 100 | | 100 | 100 | | | |
| | Dicumyl peroxide | 0.3 | 1.4 | 0.3 | 0.7 | 0.7 | 0.7 | 0.3 | 0.3 | 0.3 | 0.3 |
| | 1,1-bis(t-butylperoxy)-3,3,5-trimethylcyclohexane | 0.12 | | 0.12 | 0.3 | 0.3 | | | 0.12 | 0.12 | 0.12 | 0.12 |
| | Zinc oxide | 17.5 | 16.5 | 17.5 | 11.5 | 18 | 14.5 | 22 | 15.5 | 28 | 28 |
| | Antioxidant | 0.1 | 0.1 | 0.1 | 0.1 | 0.1 | 0.1 | 0.1 | 0.1 | 0.1 | 0.1 |
| | Zinc acrylate | 26 | 25 | 26 | 31 | 26 | 34 | 16 | 33 | 25 | 25 |
| | Zinc salt of pentachlorothiophenol | 1 | 1 | 1 | 2 | 1 | 1 | 1 | 0 | 1 | 1 |
| Outer Core | | | | | | | | | | | |
| Outer Core formulation (pbw) | Polybutadiene (1) | | | | | 100 | none | | | | |
| | Polybutadiene (2) | | 30 | | | | | | | | |
| | Polybutadiene (3) | | | 100 | | | | | 100 | 100 | 100 |
| | Polybutadiene (4) | | 70 | | | | | | | | |
| | Polybutadiene (5) | 100 | | | 100 | | | 100 | | | |
| | Dicumyl peroxide | 0.3 | 1.4 | 0.3 | 0.7 | 0.7 | | 0.3 | 0.3 | 0.3 | 0.3 |
| | 1,1-bis(t-butylperoxy)-3,3,5-trimethylcyclohexane | 0.12 | | 0.12 | 0.3 | 0.3 | | | 0.12 | 0.12 | 0.12 | 0.12 |
| | Zinc oxide | 14.5 | 12 | 14.5 | 7.5 | 14.5 | | 14.5 | 12 | 24.5 | 24.5 |
| | Antioxidant | 0.1 | 0.1 | 0.1 | 0.1 | 0.1 | | 0.1 | | 0.1 | 0.1 |
| | Zinc acrylate | 34 | 36 | 34 | 40 | 34 | | 34 | 41 | 34 | 34 |
| | Zinc salt of pentachlorothiophenol | 1 | 1 | 1 | 2 | 1 | | 1 | 0 | 1 | 1 |

Rebound:

The initial velocity of the solid cores consisting the center cores and the outer cores was measured with the same type of initial velocity instrument as used by the official regulating body—the United States Golf Association (USGA). Each rebound value shown in Table 4 is the difference between the initial velocity of the solid core obtained in that particular example and the initial velocity of the solid core obtained in Comparative Example 4.

In each example, the resulting solid core was placed in a given mold and the appropriate resin shown in Table 3 was injection-molded over the core, thereby producing an inner layer-covered core. The covered core was then transferred to a given mold, and the appropriate resin shown in Table 3 was injection molded over the covered core, yielding a solid golf ball having a diameter of about 42.7 mm and a weight of about 45.3 g. Trade names appearing in Table 3 are described below.

Himilan: An ionomer resin produced by DuPont-Mitsui Polychemicals Co., Ltd.
Surlyn: An ionomer resin produced by E.I. du Pont de Nemours and Co.
Dynaron: An E-EB-E block copolymer produced by JSR Corporation
Pandex: A polyurethane elastomer produced by Bayer-DIC Polymer, Ltd.

The properties of the resulting golf balls were determined as described below. The results are shown in Table 4.

Material Properties:

The Shore D hardnesses of the inner cover layer and the outer cover layer were measured with a durometer by the test method described in ASTM D2240.

Golf Ball Properties:

The carry and total distance were measured when the ball was hit at a head speed (HS) of 50 m/s with a driver (No. 1 Wood) mounted on a swing machine.

Feel:

The feel of the ball when actually shot with a driver (No. 1 Wood) and putter was rated by five professional and five top-caliber amateur golfers as "Too hard," "Slightly hard," "Good" or "Slightly soft," "Too soft." The rating assigned most often to a particular ball was used as that ball's overall rating.

TABLE 3

| | A | B | C | D | E | F |
|---|---|---|---|---|---|---|
| Formulation (pbw) | | | | | | |
| Himilan 1706 | 50 | | | | | |
| Himilan 1605 | 50 | | | | | |
| Himilan 1557 | | | | | | 20 |
| Himilan 1855 | | | | | | 30 |
| Surlyn 8945 | | 35 | | | | |
| Surlyn 9945 | | 35 | | | | |
| Surlyn 8120 | | | 100 | | | 50 |
| Dynaron 6100P | | 30 | | | | |
| Pandex T8290 | | | | 50 | | |
| Pandex T8295 | | | | 50 | 100 | |
| Titanium dioxide | 4 | 4 | 4 | 2.7 | 2.7 | 4 |

TABLE 4

| | | | Example | | | | Comparative Example | | | | | |
|---|---|---|---|---|---|---|---|---|---|---|---|---|
| | | | 1 | 2 | 3 | 4 | 1 | 2 | 3 | 4 | 5 | 6 |
| Sold Core | Center Core | Outer diameter (mm) | 28.9 | 26.0 | 28.9 | 25.2 | 28.9 | 36.3 | 28.9 | 28.9 | 28.9 | 28.9 |
| | | Weight (g) | 14.5 | 10.5 | 14.5 | 9.5 | 14.5 | 28.8 | 14.5 | 14.5 | 15.3 | 15.3 |
| | | Specific gravity | 1.15 | 1.14 | 1.15 | 1.13 | 1.15 | 1.15 | 1.15 | 1.15 | 1.21 | 1.21 |
| | | Center hardness JIS-C scale | 50.0 | 50.0 | 50.0 | 59.0 | 50.0 | 63.0 | 35.0 | 63.0 | 50.0 | 50.0 |
| | | Surface Hardness JIS-C scale | 67.0 | 65.0 | 67.0 | 74.0 | 67.0 | 82.0 | 50.0 | 82.0 | 67.0 | 67.0 |
| | | Cross-Sectional hardness difference JIS-C scale | 17.0 | 15.0 | 17.0 | 15.0 | 17.0 | 19.0 | 15.0 | 19.0 | 17.0 | 17.0 |
| | Outer core | Thickness (mm) | 3.7 | 5.2 | 3.7 | 7.0 | 3.7 | | 3.7 | 3.7 | 3.7 | 3.7 |
| | | Portion of 1 mm outside from the border the center core and the outer core | 72.0 | 75.0 | 72.0 | 78.0 | 72.0 | | 72.0 | 85.0 | 72.0 | 72.0 |
| | | Surface hardness JIS-C scale | 82.0 | 85.0 | 82.0 | 91.0 | 82.0 | | 82.0 | 95.0 | 82.0 | 82.0 |
| | | The hardness difference between the outer core and the center core surface on JIS C scale | 5.0 | 10.0 | 5.0 | 4.0 | 5.0 | | 22.0 | 3.0 | 5.0 | 5.0 |
| | | Specific gravity | 1.15 | 1.14 | 1.15 | 1.13 | 1.15 | | 1.15 | 1.15 | 1.21 | 1.21 |
| | Rebound (m/s) | | +0.6 | +0.4 | +0.5 | +0.3 | 0 | −0.2 | −0.8 | 0 | +0.5 | +0.5 |
| Inner cover layer | | Type | A | A | B | A | A | A | A | A | C | C |
| | | Shore D hardness | 63 | 63 | 56 | 63 | 63 | 63 | 63 | 63 | 45 | 45 |
| | | Specific gravity | 0.98 | 0.98 | 0.97 | 0.98 | 0.98 | 0.98 | 0.98 | 0.98 | 0.98 | 0.98 |
| | | Thickness (mm) | 1.7 | 1.2 | 1.7 | 1.0 | 1.7 | 1.7 | 1.7 | 1.7 | 1.7 | 1.7 |
| Outer cover layer | | Type | D | D | E | D | D | D | D | D | F | A |
| | | Shore D hardness | 47 | 47 | 51 | 47 | 47 | 47 | 47 | 47 | 53 | 63 |
| | | Specific gravity | 1.18 | 1.18 | 1.18 | 1.18 | 1.18 | 1.18 | 1.18 | 1.18 | 0.98 | 0.98 |
| | | Thickness (mm) | 1.5 | 1.1 | 1.5 | 0.8 | 1.5 | 1.5 | 1.5 | 1.5 | 1.5 | 1.5 |
| Golf ball properties | When hit with No. 1 Wood at HS of 50 m/s | Carry (m) | 229.1 | 226.8 | 227.9 | 226.1 | 223.0 | 221.2 | 215.2 | 223.2 | 217.9 | 222.3 |
| | | Total distance (m) | 260.6 | 258.4 | 259.8 | 257.5 | 254.1 | 251.7 | 248.5 | 252.9 | 248.6 | 253.5 |
| | | Spin rate (rpm) | 3090 | 3081 | 3077 | 3053 | 3093 | 3211 | 2865 | 3368 | 3283 | 3151 |
| | | Feel on impact | good | good | good | Slightly hard | good | Slightly hard | too soft | too hard | too soft | good |
| | | Spin rate on approach shot (sand wedge; HS 20 m/s) | 6323 | 6298 | 6259 | 6281 | 6318 | 6320 | 6262 | 6355 | 6218 | 4318 |
| | | Feel of ball when hit with putter | good | good | good | good | good | good | good | Slightly hard | too soft | too hard |

Japanese Patent Application No. 2001-163238 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A multi-piece solid golf ball comprising a solid core consisting of a center core and an outer core, an inner cover layer and an outer cover layer, wherein the solid core is molded from a rubber composition comprising 100 parts by weight of a base rubber composed of (a) 20 to 100 wt % of a polybutadiene having a cis-1,4 content of at least 60% and a 1,2 vinyl content of at most 2%, having a viscosity η at 25° C. as a 5 wt % solution in toluene of up to 600 mPa·s, being synthesized using a rare-earth catalyst, in combination with (b) 0 to 80 wt % of a diene rubber other than component (a), (c) 10 to 60 parts by weight of an unsaturated carboxylic acid or a metal salt thereof or both, (d) 0.1 to 5 parts by weight of an organosulfur compound, (e) 5 to 80 parts by weight of an inorganic filler, and (f) 0.1 to 5 parts by weight of an organic peroxide;

the center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, a surface of the outer core has a JIS-C hardness of 75 to 95, the inner cover layer has a Shore D hardness of 50 to 80, the outer cover layer has a Shore D hardness of 35 to 60, and the outer cover layer has a lower Shore D hardness than the inner cover layer.

2. The golf ball of claim 1, wherein the polybutadiene (a) satisfies relationship: $10B+5 \leq A \leq 10B+60$, wherein A is the Mooney viscosity ($ML_{1+4}$ (100° C.)) of the polybutadiene and B is the ratio Mw/Mn between the weight-average molecular weight Mw and the number-average molecular weight Mn of the polybutadiene.

3. The golf ball of claim 1, wherein the diene rubber (b) includes 30 to 100 wt % of a second polybutadiene which has a cis-1,4 content of at least 60% and a 1,2 vinyl content of at most 5%, has a Mooney viscosity ($MIL_{1+4}$ (100° C.)) of not more than 55, and satisfies the relationship:

$$\eta \leq 20A - 550,$$

wherein A is the Mooney viscosity ($ML_{1+4}$ (100° C.)) of the second polybutadiene and $\eta$ is the viscosity of the second polybutadiene, in mPa·s, at 25° C. as a 5 wt % solution in toluene.

4. The golf ball of claim 3, wherein the second polybutadiene in component (b) is synthesized using a Group VIII catalyst.

5. The golf ball of claim 1, wherein the center core has a diameter of 15 to 36 mm and the outer core has a thickness of 1.5 to 10 mm, and the inner cover layer has a thickness of 0.2 to 3.0mm and the outer cover layer has a thickness of 0.2 to 2.0 mm.

6. The golf ball of claim 1, wherein the polybutadiene has a cis-1,4 content of at least 80% and a 1,2 vinyl content of at most 1.7%.

7. The golf ball of claim 1, wherein the polybutadiene has a cis-1,4 content of at least 90% and a 1,2 vinyl content of at most 1.5%.

8. The golf ball of claim 1, wherein the polybutadiene has a cis-1,4 content of at least 95% and a 1,2 vinyl content of at most 1.3%.

9. The golf ball of claim 1, wherein the polybutadiene has a viscosity $\eta$ at 25° C. as a 5 wt % solution in toluene in the range of 50 to 550 mPa·s.

10. The golf ball of claim 1, wherein the polybutadiene has a viscosity $\eta$ at 25° C. as a 5 wt % solution in toluene in the range of 100 to 500 mPa·s.

11. The golf ball of claim 1, wherein the polybutadiene has a viscosity $\eta$ at 25° C. as a 5 wt % solution in toluene in the range of 150 to 450 mPa·s.

12. The golf ball of claim 1, wherein the polybutadiene has a viscosity $\eta$ at 25° C. as a 5 wt % solution in toluene in the range of 200 to 400 mPa·s.

13. The golf ball of claim 2, wherein A is at least 10B+7, but not more than 10B+55.

14. The golf ball of claim 2, wherein A is at least 10B+8, but not more than 10B+50.

15. The golf ball of claim 2, wherein A is at least 10B+9, but not more than 10B+45.

16. The golf ball of claim 2, wherein the Mooney viscosity ($ML_{1+4}$ (100° C.)) of the polybutadiene is in the range of 20 to 80.

17. The golf ball of claim 2, wherein the Mooney viscosity ($ML_{1+4}$ (100° C.)) of the polybutadiene is in the range of 30 to 70.

18. The golf ball of claim 2, wherein the Mooney viscosity ($ML_{1+4}$ (100° C.)) of the polybutadiene is in the range of 40 to 65.

19. The golf ball of claim 2, wherein the Mooney viscosity ($ML_{1+4}$ (100° C.)) of the polybutadiene is in the range of 50 to 60.

20. The golf ball of claim 1, wherein the rare-earth catalyst is at least one rare-earth catalyst selected from the group consisting of a lanthanide series rare-earth compound, an organoaluminum compound, an alumoxane, and a halogen-bearing compound.

21. The golf ball of claim 1, wherein the base rubber is composed of 25 to 90 wt % of said polybutadiene.

22. The golf ball of claim 1, wherein the base rubber is composed of 30 to 80 wt % of said polybutadiene.

23. The golf ball of claim 1, wherein the base rubber is composed of 35 to 70 wt % of said polybutadiene.

24. The golf ball of claim 1, wherein the diene rubber is selected from the group consisting of polybutadiene rubber, styrene-butadiene rubber, natural rubber, polyisoprene rubber, ethylene-propylene-diene rubber, and mixtures thereof.

25. The golf ball of claim 1, wherein the diene rubber is included in an amount in the range of 10 to 75%.

26. The golf ball of claim 1, wherein the diene rubber is included in an amount in the range of 20 to 70%.

27. The golf ball of claim 1, wherein the diene rubber is included in an amount in the range of 30 to 65%.

28. The golf ball of claim 3, wherein the second polybutadiene has a cis-1,4 content of at least 80% and a 1,2 vinyl content of at most 4.5%.

29. The golf ball of claim 3, wherein the second polybutadiene has a cis-1,4 content of at least 90% and a 1,2 vinyl content of at most 4.0%.

30. The golf ball of claim 3, wherein the second polybutadiene has a cis-1,4 content of at least 95% and a 1,2 vinyl content of at most 3.5%.

31. The golf ball of claim 3, wherein the second polybutadiene has a Mooney viscosity of at least 10.

32. The golf ball of claim 3, wherein the second polybutadiene has a Mooney viscosity in the range of 20 to 55.

33. The golf ball of claim 3, wherein the second polybutadiene has a Mooney viscosity in the range of 25 to 50.

34. The golf ball of claim 3, wherein the second polybutadiene has a Mooney viscosity in the range of 30 to 45.

35. The golf ball of claim 3, wherein the second polybutadiene has a viscosity in the range of 20A–700 to 20A–560.

36. The golf ball of claim 3, wherein the second polybutadiene has a viscosity in the range of 20A–680 to 20A–580.

37. The golf ball of claim 3, wherein the second polybutadiene has a viscosity in the range of 20A–650 to 20A–590.

38. The golf ball of claim 3, wherein the diene rubber includes 50 to 90 wt % of said second polybutadiene.

39. The golf ball of claim 3, wherein the diene rubber includes 70 to 80 wt % of said second polybutadiene.

40. The golf ball of claim 1, wherein there is 15 to 50 parts by weight of said unsaturated carboxylic acid or said metal salt thereof or both.

41. The golf ball of claim 1, wherein there is 20 to 45 parts by weight of said
unsaturated carboxylic acid or said metal salt thereof or both.

42. The golf ball of claim 1, wherein there is no more than 40 parts by weight of said unsaturated carboxylic acid or said metal salt thereof or both.

43. The golf ball of claim 1, wherein the organosulfur is included in the range of 0.2 to 4 parts by weight.

44. The golf ball of claim 1, wherein the organosulfur is included in the range of 0.5 to 3 parts by weight.

45. The golf ball of claim 1, wherein no more than 2 parts by weight of the organosulfur is included.

46. The golf ball of claim 1, wherein the inorganic filler is included in an amount in the range of 7 to 50 parts by weight.

47. The golf ball of claim 1, wherein the inorganic filler is included in an amount in the range of 10 to 45 parts by weight.

48. The golf ball of claim 1, wherein the inorganic filler is included in an amount in the range of 13 to 40 parts by weight.

49. The golf ball of claim 1, wherein the organic peroxide is included in an amount in the range of 0.3 to 4 parts by weight.

50. The golf ball of claim 1, wherein the organic peroxide is included in an amount in the range of 0.5 to 3 parts by weight.

51. The golf ball of claim 1, wherein the organic peroxide is included in an amount in the range of 0.7 to 2 parts by weight.

52. The golf ball of claim 1, wherein said rubber composition further includes an antioxidant.

53. The golf ball of claim 51, wherein said antioxidant is included in an amount in the range of 0.05 to 3 parts by weight per 100 parts by weight of said base rubber.

54. The golf ball of claim 1, wherein a center hardness of said center core is in the range of 42 to 58 on the JIS-C hardness scale.

55. The golf ball of claim 1, wherein a center hardness of said center core is in the range of 44 to 56 on the JIS-C hardness scale.

56. The golf ball of claim 1, wherein a center hardness of said center core is in the range of 46 to 54 on the JIS-C hardness scale.

57. The golf ball of claim 1, wherein a surface hardness of said center core is in the range of 55 to 69 on the JIS-C hardness scale.

58. The golf ball of claim 1, wherein a surface hardness of said center core is in the range of 57 to 73 on the JIS-C hardness scale.

59. The golf ball of claim 1, wherein a surface hardness of said center core is in the range of 59 to 71 on the JIS-C hardness scale.

60. The golf ball of claim 1, wherein a surface hardness of said center core is in the range of 61 to 69 on the JIS-C hardness scale.

61. The golf ball of claim 1, wherein a difference in JIS-C hardness between a center hardness of said center core and a surface hardness of said center core is at least 15.

62. The golf ball of claim 1, wherein a difference in JIS-C hardness between a center hardness of said center core and a surface hardness of said center core is in the range of 12 to 25.

63. The golf ball of claim 1, wherein a difference in JIS-C hardness between a center hardness of said center core and a surface hardness of said center core is in the range of 13 to 23.

64. The golf ball of claim 1, wherein a difference in JIS-C hardness between a center hardness of said center core and a surface hardness of said center core is in the range of 15 to 20.

65. The golf ball of claim 1, wherein the outer core has a thickness in the range of 1.5 to 10 mm.

66. The golf ball of claim 1, wherein the outer core has a thickness in the range of 2 to 9 mm.

67. The golf ball of claim 1, wherein the outer core has a thickness in the range of 2.5 to 8 mm.

68. The golf ball of claim 1, wherein the outer core has a thickness in the range of 3 to 7 mm.

69. The golf hail of claim 1, wherein the difference in hardness between the surface of the center core and the outer core is in the range of 2 to 30.

70. The golf ball of claim 1, wherein the difference in hardness between the surface of the center core and the outer core is in the range of 3 to 20.

71. The golf ball of claim 1, wherein the difference in hardness between the surface of the center core and the outer core is in the range of 4 to 15.

72. The golf ball of claim 1, wherein the hardness of the surface of the outer core is in the range of 77 to 93 JIS-C.

73. The golf ball of claim 1, wherein the hardness of the surface of the outer core is in the range of 79 to 91 JIS-C.

74. The golf ball of claim 1, wherein the hardness of the surface of the outer core is in the range of 81 to 89 JIS-C.

75. The golf ball of claim 1, wherein the cross-sectional hardness of 1 mm outside from the border between the center core and the outer core is in the range of 68 to 83 JIS-C.

76. The golf ball of claim 1, wherein the cross-sectional hardness of 1 mm outside from the border between the center core and the outer core is in the range of 71 to 80 JIS-C.

77. The golf ball of claim 1, wherein the cross-sectional hardness of 1 mm outside from the border between the centex core and the outer core is in the range of 74 to 77 JIS-C.

78. The golf ball of claim 1, wherein the inner cover layer has a Shore D hardness in the range of 51 to 75.

79. The golf ball of claim 1, wherein the inner cover layer has a Shore D hardness in the range of 52 to 70.

80. The golf ball of claim 1, wherein the inner cover layer has a Shore D hardness in the range of 53 to 65.

81. The golf ball of claim 1, wherein the outer cover layer has a Shore D hardness in the range of 40 to 58.

82. The golf ball of claim 1, wherein the outer cover layer has a Shore D hardness in the range of 45 to 56.

83. The golf ball of claim 1, wherein the outer cover layer has a Shore D hardness in the range of 48 to 54.

84. The golf ball of claim 1, wherein the difference in Shore D hardness between said inner cover layer and said outer cover layer is at least 2.

85. The golf ball of claim 1, wherein the difference in Shore D hardness between said inner cover layer and said outer cover layer is in the range of 5 to 30.

86. The golf ball of claim 1, wherein the difference in Shore D hardness between said inner cover layer and said outer cover layer is in the range of 7 to 25.

87. The golf ball of claim 1, wherein the difference in Shore D hardness between said inner cover layer and said outer cover layer is in the range of 9 to 20.

88. The golf ball of claim 1, wherein the inner cover layer has a thickness of 0.2 to 3.0 mm.

89. The golf ball of claim 1, wherein the outer cover layer has a thickness of 0.2 to 2.0 mm.

90. A multi-piece solid golf ball comprising a solid core consisting of a center core and an outer core, an inner cover layer and an outer cover layer, wherein the solid core is molded from a rubber composition comprising 100 parts by weight of a base rubber composed of (a) 35 to 70 wt % of a polybutadiene having a cis-1,4 content of at least 95% and a 1,2 vinyl content of at most 1.3%, having a viscosity $\eta$ at 25° C. as a 5 wt % solution in toluene of up to 400 mPa·s, being synthesized using a rare-earth catalyst, in combination with (b) 30 to 65 wt % of a diene rubber other than Component (a), (c) 10 to 60 parts by weight of an unsaturated carboxylic acid or a metal salt thereof or both, (d) 0.1 to 5 parts by weight of an organosulfur compound, (e) 5 to 80 parts by weight of an inorganic filler, and (f) 0.1 to 5 parts by weight of an organic peroxide;

the center core has a JIS-C hardness of 40 to 60 on its center and a JIS-C hardness of 55 to 75 on its surface and the difference therebetween is in the range of 10 to 20, the outer core is harder than the surface hardness of the center core, the cross-sectional hardness of 1 mm outside from the border between the center core and the outer core is from 65 to 85 on a JIS-C hardness, a surface of the outer core has a JIS-C of 75 to 95, the inner cover layer has a Shore D hardness of 50 to 80, the outer cover layer has a Shore D hardness of 35 to 60, and the outer cover layer has a lower Shore D hardness than the inner cover layer, wherein the polybutadiene (a) satisfies relationship: $10B+5 \leq A \leq 10B+60$, wherein A is the Mooney viscosity ($ML_{1+4}$ (100° C.)) of the polybutadiene and B is the ratio Mw/Mn between the weight-average molecular weight Mw and the number-average molecular weight Mn of the polybutadiene, and wherein the diene rubber (b) includes 30 to 100 wt % of a second polybutadiene which has a cis-1,4 content of at least 60% and a 1,2 vinyl content of at most 5%, has a Mooney viscosity ($ML_{1+4}$ (100° C.)) of not more than 55, and satisfies the relationship:

$\eta \leq 20A-550$, wherein A is the Mooney viscosity ($ML_{1+4}$ (100° C.)) of the second polybutadiene and $\eta$ is the viscosity of the second polybutadiene, in mPa·s, at 25° C. as a 5 wt % solution in toluene.

* * * * *